United States Patent Office 3,219,686
Patented Nov. 23, 1965

3,219,686
PREPARATION OF DIOL DICARBAMATES
WITH STANNIC CHLORIDE
Sidney Beinfest, Berkeley Heights, Phillip Adams, Murray Hill, and Marvin Weiss, New Providence, N.J., assignors, by mesne assignments, to Millmaster Onyx Corporation, a corporation of New York
No Drawing. Filed Dec. 29, 1961, Ser. No. 163,085
7 Claims. (Cl. 260—482)

This invention relates to new and useful improvements in the preparation of dicarbamates, particularly suited for use as pharmaceuticals. More particularly, it relates to a process of that nature employing stannic chloride as the catalyst and further improvements in purifying the products.

Diol dicarbamates, particularly alkanediol dicarbamates have been finding increasing use as pharmaceuticals.

These materials have been prepared in one manner by the reaction of organic diols with a lower aliphatic, usually alkyl carbamate, in the absence of extraneous diluent at subatmospheric pressure in the presence of aluminum alkoxides as catalysts; see U.S. Patent No. 2,934,559, issued April 26, 1960. A drawback of this system is the deactivation of the catalyst in the presence of water even in small amounts.

Various metal compounds have also been employed in the high temperature condensation of substituted diurethanes and glycols. These metal compounds, however, leave excessive residues in the preparation, which residue content, even after treatment, is excessively high and thus inconsistent with the purity requirements of pharmaceutical materials.

It has now been found that diol dicarbamate pharmaceuticals can more advantageously be prepared from the reaction of diols such as alkanediols and lower aliphatic monocarbamates by the employment of stannic chloride as the catalyst. This catalyst, which is not deactivated in the presence of water in the amounts normally encountered in equipment and reactants employed, is adapted to an improved process for working up the product that also leads to the obtaining of materials of very high purity.

It is surprising that stannic chloride should be so effective a catalyst because, at the temperatures utilized, other so-called alcoholysis catalysts give neither the efficiency nor the ready purification obtained with stannic chloride. Even the closely related stannous chloride is relatively ineffective.

On the other hand, organic compounds of tin have been described as ester interchange catalysts and as condensation polymerization catalysts. When organo-tin compounds are used in the preparation of pharmaceutical products, it has not been found possible to remove these tin compounds to a sufficiently low level to make the resultant products generally useful for pharmaceutical purposes. This is a particular drawback in the case of organo-tin compounds because of their known toxicity. The use of stannic chloride, however, gives a product in which the tin residue is less than ten parts per million.

The equation for the reaction is illustrated below for the preparation of butane-1,3-diol dicarbamate from the corresponding diol and ethyl carbamate:

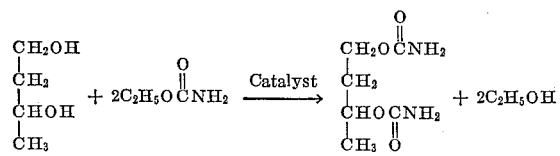

The diols that can be utilized are those corresponding to the general formula:

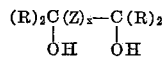

where R is a radical selected from the group consisting of hydrogen, alkyl, cyclic, heterocyclic, or aryl radicals; Z is either an alkyl, alkenyl, cyclic, aryl radical or substituted derivatives thereof such as oxygenated ones; and $x$ is any number including zero. It is to be understood that the R groups can be the same or different on each of the carbon atoms. While it is apparent that this invention is applicable to diols regardless of the nature of the substituent atoms, it is particularly suited for preparing aliphatic especially alkanediol dicarbamates. Typical diols used are butane-1,3-diol; 2-methyl-2-sec-butyl propane-1,3-diol; pentane-1,5-diol; diethylene glycol; 2-butyne-1,4-diol; 2-butene-1,4-diol and 2-methyl-2-n-propyl propane-1,3-diol.

The lower aliphatic monocarbamates utilized include: methyl, ethyl, n-propyl, n-butyl, and 2-methoxy ethyl carbamates, etc. The term "lower aliphatic carbamate reactant" refers to a carbamate whose aliphatic or alkyl nucleus is converted during the course of the reaction as shown by the equation, to an alcohol of lower boiling point than the original diol reactant.

The quantities of reactants employed can follow the stoichiometric relations of the equation or the carbamate can be used in a molar excess of 100 percent or higher.

The stannic chloride catalyst is utilized in an amount of from 0.5 to 20 g./mole of reactant diol. The stannic chloride can be added directly to the reaction system or used dissolved in an inert organic solvent.

The temperature employed in the reaction is in the range of 100°–160° C., preferably about 115°–140° C. The pressure can vary considerably so as to maintain the proper temperature and evolution of alcohol formed during the reaction.

The use of an extraneous diluent is optional. When employed, the diluent must be one that lends itself to ready separation from the alcohol which goes overhead. The diluents typically are aromatic hydrocarbons such as chlorobenzene, toluene, xylene, etc.

When the reaction is essentially complete, enough aqueous alkali is added to the system to convert the soluble tin chloride to an insoluble tin oxygen compound, the exact nature of which depends on the alkali. This is accomplished by adding the alkali to obtain a pH of 4–11, preferably 6–8.5. The aqueous alkali reagents that can be employed are the conventional reagents, e.g., ammonia, sodium carbonate, sodium bicarbonate, potassium hydroxide, etc. After alkali addition, in the absence of extraneous diluent, the precipitate is separated as by filtration at a minimum temperature of 60° C., and a minimum of preferably 85° C., from the dicarbamate solution. With a diluent lower temperatures can be used. The dicarbamate can then be further worked up by conventional means, e.g., see U.S. Patent No. 2,857,681.

This invention will be better understood by reference to the following examples of the preparation of the indicated compounds according to the process of this invention.

*Example 1*

Sixty-six grams of 2-methyl-2-n-propyl propane-1,3-diol, 82.5 grams of methyl carbamate and 2 grams of stannic chloride were heated together under reduced pressure at 120 to 135° C. When the theoretical amount of methanol had been collected, enough 28% ammonia was added to a pH of 8.0. The contents of the reaction were poured in 90° C. water and filtered. The filtrate was allowed to crystallize. There was obtained a good yield of 2-methyl-2-n-propyl propane-1,3-diol dicarbamate which had a melting point of 105.5–106.5° C. and contained less than 5 parts per million of tin.

*Example 2*

The same procedure as in Example 1 was followed except that 150 grams of methyl carbamate and 3 grams of stannic chloride dissolved in 6 cc. of xylene were used. Excess methyl carbamate was removed by distillation before the reaction contents were poured into water. There was obtained a good yield of product which had a melting point range of 105°–106° C. containing less than 10 parts per million of tin.

*Example 3*

The same procedure as in Examples 1 and 2 was followed except that ethyl carbamate replaced methyl carbamate. Similar yields of product containing low amounts of tin were obtained.

*Example 4*

The procedure as in Example 1 was followed except for the use of a different diol. The reaction contents were poured into a mixture of water and isopropyl alcohol and allowed to crystallize after pH adjustment with ammonia and filtration. There was obtained a good yield of 2-methyl-2-sec-butyl propane diol dicarbamate having a melting point range of 92–93° C. with less than 5 p.p.m. of tin.

*Example 5*

A similar procedure as in Example 1 was followed except for the use of a different diol. Good yields of diethylene glycol dicarbamate were obtained from the reaction with methyl urethane and stannic chloride at a temperature in the range of 123° to 129° C. The product had a melting point of 154° to 156° C. with less than 5 p.p.m. of tin.

*Example 6*

A similar procedure as in Example 1 was followed except for the use of a different diol. Good yields of 1,3-butylene glycol dicarbamate were obatined utilizing a temperature in the range of 110° to 128° C. The product had a melting point of 150° to 152° C. and contained less than 5 p.p.m. of tin.

*Example 7*

A similar procedure as in Example 1 was followed except for the use of a different diol. Good yields of 2-butyne-1,4-diol dicarbamate were obtained utilizing a temperature in the range of 115° to 126° C. The product had a melting point of 192° to 194° C. and contained less than 5 p.p.m. of tin.

*Example 8*

A similar procedure as in Example 1 was followed except for the use of a different diol. Good yields of 2-butene-1,4-diol dicarbamate were obtained from the reaction employing a temperature in the range of 116° to 130° C. The product had a melting point range of 128.5° to 130° C. and contained less than 5 p.p.m. of tin.

Other examples were run obtaining similar results employing other alkalis, e.g., $Na_2CO_3$.

The process of this invention is also applicable to polyols as well as monohydric alcohols.

The advantages of this invention will be apparent to the skilled in the art. A water insensitive catalyst is provided to give products of improved purity in high yields.

It is to be understood that this invention is not limited to the specific examples which have been offered merely as illustrations and that modifications may be made without departing from the spirit of the invention.

What is claimed is:

1. In a process for preparing an aliphatic diol dicarbamate by the reaction of the corresponding diol with a lower aliphatic monocarbamate, whose aliphatic nucleus is converted during the course of the reaction to an alcohol lower boiling than the diol reactant, at a temperature in the range of about 115°–140° C., the improvement which comprises utilizing stannic chloride, in an amount of from 0.5 to 20 grams per mole of reactant diol, as the catalyst and treating the reaction system with an aqueous alkali to obtain a pH of 6–8.5 thereby precipitating an oxygen-containing tin compound and separating it from the residual system, whereby the diol dicarbamate product contains less than ten parts per million of tin.

2. The process of claim 1 in which the alkali is ammonia.

3. The process of claim 1 in which the diol is diethylene glycol.

4. The process of claim 1 in which the diol is 2-methyl-2-sec-butyl propane-1,3-diol.

5. The process of claim 1 in which the diol is 1,3-butylene glycol.

6. The process of claim 1 in which the diol is 2-methyl-2-n-propyl propane-1,3-diol.

7. The process of claim 1 in which the diol is 2-butyne-1,4-diol.

References Cited by the Examiner

UNITED STATES PATENTS

| | | | |
|---|---|---|---|
| 2,878,280 | 3/1959 | Berger et al. | 260—482 |
| 2,915,550 | 12/1959 | Bell et al. | 260—482 |
| 2,917,535 | 12/1959 | Britton et al. | 260—482 |
| 2,934,559 | 4/1960 | Beinfest et al. | 260—482 |
| 2,987,541 | 6/1961 | Bissinger et al. | 260—482 |

OTHER REFERENCES

Hackh's Chemical Dictionary, page 30 (third edition), McGraw-Hill, New York, N.Y., 1944.

Mellor: Comprehensive Treatise of Inorganic and Theoretical Chemistry, vol. 7, page 402 (1927) Longmans, Green and Co., New York, N.Y.

LORRAINE A. WEINBERGER, *Primary Examiner.*

DANIEL D. HORWITZ, LEON ZITVER, *Examiners.*